(12) United States Patent
Mahmoud et al.

(10) Patent No.: US 9,593,977 B2
(45) Date of Patent: Mar. 14, 2017

(54) WATER TANK NOTIFIER

(71) Applicants: King Fahd University of Petroleum and Minerals, Dhahran (SA); American University of Sharjah, Sharjah (SA)

(72) Inventors: Tarek Haissam Mahmoud, Jeddah (SA); Hisham Haissam Mahmoud, Jeddah (SA)

(73) Assignees: King Fahd University of Petroleum and Minerals, Dhahran (SA); American University of Sharjah, Sharjah (AE)

( * ) Notice: Subject to any disclaimer, the term of this patent is extended or adjusted under 35 U.S.C. 154(b) by 147 days.

(21) Appl. No.: 14/610,819

(22) Filed: Jan. 30, 2015

(65) Prior Publication Data

US 2016/0223383 A1    Aug. 4, 2016

(51) Int. Cl.
| | |
|---|---|
| *G01F 23/30* | (2006.01) |
| *G01F 23/58* | (2006.01) |
| *G01F 23/60* | (2006.01) |
| *G01F 23/64* | (2006.01) |
| *G01F 15/06* | (2006.01) |
| *G01F 1/00* | (2006.01) |

(52) U.S. Cl.
CPC .............. *G01F 23/30* (2013.01); *G01F 15/06* (2013.01); *G01F 23/58* (2013.01); *G01F 23/60* (2013.01); *G01F 23/64* (2013.01); *G01F 1/00* (2013.01)

(58) Field of Classification Search
CPC .......... G01F 23/30; G01F 23/58; G01F 23/60; G01F 23/603

USPC .......... 116/109, 110, 227, 228, 229; 73/313, 73/319, 322
See application file for complete search history.

(56) References Cited

U.S. PATENT DOCUMENTS

| | | | | |
|---|---|---|---|---|
| 409,339 | A * | 8/1889 | Stuyvesant | G01F 23/58 116/228 |
| 2,304,822 | A * | 12/1942 | Harrison et al. | G01F 9/023 235/61 J |
| 2,457,905 | A * | 1/1949 | Korody | G01F 23/58 73/319 |
| 2,738,675 | A * | 3/1956 | Blair | G01F 23/58 137/429 |

(Continued)

FOREIGN PATENT DOCUMENTS

| | | |
|---|---|---|
| CN | 201126374 Y | 10/2008 |
| CN | 202018317 U | 10/2011 |

(Continued)

*Primary Examiner* — Richard A. Smith
(74) *Attorney, Agent, or Firm* — Oblon, McClelland, Maier & Neustadt, L.L.P.

(57) ABSTRACT

A system including a float ball, a pole, a sleeve, an indicator disk, and a dynamo circuit provides information regarding the water level in a tank, and whether fluid is flowing into the tank. The pole slides within the sleeve, through a slab above the tank. A first end of the pole is supported by the float ball, which floats within the tank, while the second end of the pole is located above the slab and supports the indicator disk. A user can detect the water level in the tank based on the height of the indicator disk. A user can also detect whether water is flowing into the tank. The dynamo circuit activates an LED located on the indicator disk when water is flowing into the tank.

8 Claims, 6 Drawing Sheets

(56) References Cited

U.S. PATENT DOCUMENTS

| | | | | |
|---|---|---|---|---|
| 3,630,083 A * | 12/1971 | Gorans | ................. | B01D 23/28 |
| | | | | 73/294 |
| 4,187,503 A * | 2/1980 | Walton | ................... | G08B 21/18 |
| | | | | 116/110 |
| 5,862,775 A * | 1/1999 | Stroud | ................... | G01F 23/76 |
| | | | | 116/228 |
| 6,125,697 A * | 10/2000 | Holton et al. | ...... | G01F 23/0038 |
| | | | | 324/207.14 |
| 6,223,596 B1 * | 5/2001 | Wilkins | ................. | G01F 23/30 |
| | | | | 73/290 R |
| 6,725,800 B2 * | 4/2004 | Hawkins | ............ | G01F 23/0015 |
| | | | | 116/109 |
| 6,786,091 B1 * | 9/2004 | Aleali | ..................... | G01F 23/30 |
| | | | | 73/305 |
| 7,549,322 B2 | 6/2009 | Kaplan | | |
| 7,617,725 B2 * | 11/2009 | Howayshell | ............ | G01F 23/60 |
| | | | | 73/308 |
| 2014/0202375 A1 * | 7/2014 | Goff | ........................ | G01F 23/58 |
| | | | | 116/228 |

FOREIGN PATENT DOCUMENTS

| | | | | |
|---|---|---|---|---|
| CN | 202693082 U | 1/2013 | | |
| CN | 102506962 B | 9/2013 | | |
| GB | 2017320 A * | 10/1979 | ............ | G01F 23/70 |

\* cited by examiner

WATER TANK NOTIFIER

BACKGROUND

Field of the Disclosure

The present disclosure relates to a system for detecting water level in a tank, such as residential underground water tanks. In particular, the present disclosure relates to a system for detecting water level in a tank, and for detecting whether water is flowing into a tank.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In regions which lack natural fresh water resources, such as the Arabian Peninsula, seawater may be desalinated and pumped for domestic use. Residents of these regions may typically have an underground water tank, which the city may supply with water.

Residents may need to determine whether they have enough water stored in their water tank or whether they must supplement from outside sources. Accordingly, residents may have to check their water tank levels up to three or four times weekly, which requires them to access and open their underground water tank, which is typically inconvenient.

Existing systems may use a float and string setup, such as that used in the CNC 670 Series Liquid Level Indicator device. Such a system uses a float, a string and a marked gage board, where the float allows monitoring of the water level. The string is used to transfer the rise and fall of the float to an indicator on the gage board which allows the user to determine the exact level of water in the tank.

Other existing systems, such as the Liquid Level Systems series 600 system, may use a pressure sensor and a dial gage to read the water level in a tank. A pressure sensor may be mounted internally or externally, and may typically be used on ship tanks or for other industrial applications.

The above-mentioned existing systems may require complicated assembly parts and mechanisms to monitor water level.

SUMMARY

An exemplary embodiment of the proposed device reveals water level in a tank and detects influent water into the tank.

One aspect of the invention includes a water level indicator.

Another aspect of the invention includes a water flow indicator.

In one embodiment, the system includes a tank with liquid, a floating device in the liquid, a pole connected at a first end to the floating device, a water flow detector, and an indicator located at a second end of the pole.

In another embodiment, when the level of liquid in the tank changes the floating device moves the pole and the floating device, and when liquid is flowing into the tank the indicator generates a signal to a user.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

The characteristics and advantages of an exemplary embodiment are set out in more detail in the following description, made with reference to the accompanying drawings.

DETAILED DESCRIPTION OF THE EXEMPLARY EMBODIMENTS

It is an object and feature of an exemplary embodiment described herein to provide a way for users to determine the level of water in a tank, and whether water is flowing into the tank, without having to access the tank.

One advantage of an exemplary embodiment described herein is ease of installation and ease of operation, allowing the system to be used not only in an industrial setting, but also in a residential setting by individuals.

Another advantage of the exemplary system described herein is the ability to gather the water level information by viewing the device from a distance. The device provides an approximate indication of the water level in the tank, and whether water is inflowing.

An additional advantage of the exemplary system is the limited maintenance and power required to operate this system, which reduces the cost of the device.

These and other objects, advantages, and features of the exemplary system described herein will be apparent to one skilled in the art from a consideration of this specification, including the attached drawings.

Figure 1A:
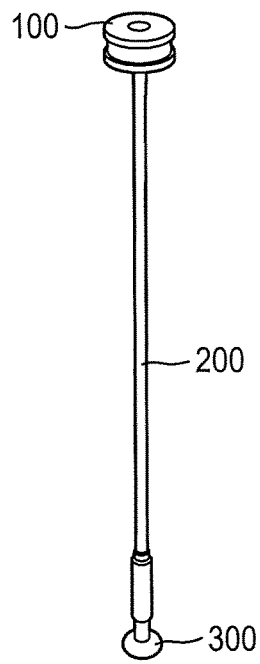
FIGS. 1a and 1b depict a three-dimensional view of an exemplary embodiment above ground.
Figure 1B:
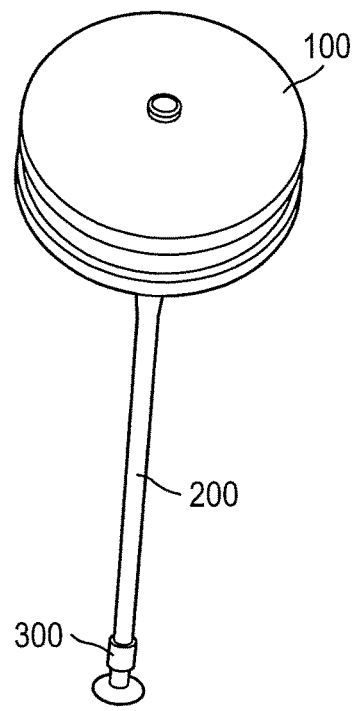
Figure 4:
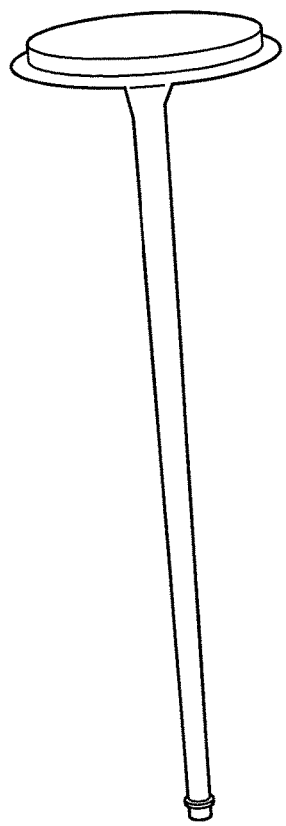
FIG. 4 depicts a three-dimensional view of a pole and indicator assembly in an exemplary embodiment.

Referring to FIG. 1, in an exemplary embodiment the system includes elements which are visible and located above ground, including an indicator disk (100) located above a pole (200) which may slide within a pole sleeve (300). As shown in FIG. 4, the pole (200) may be connected to, and support, the indicator disk (100).

Figure 2:
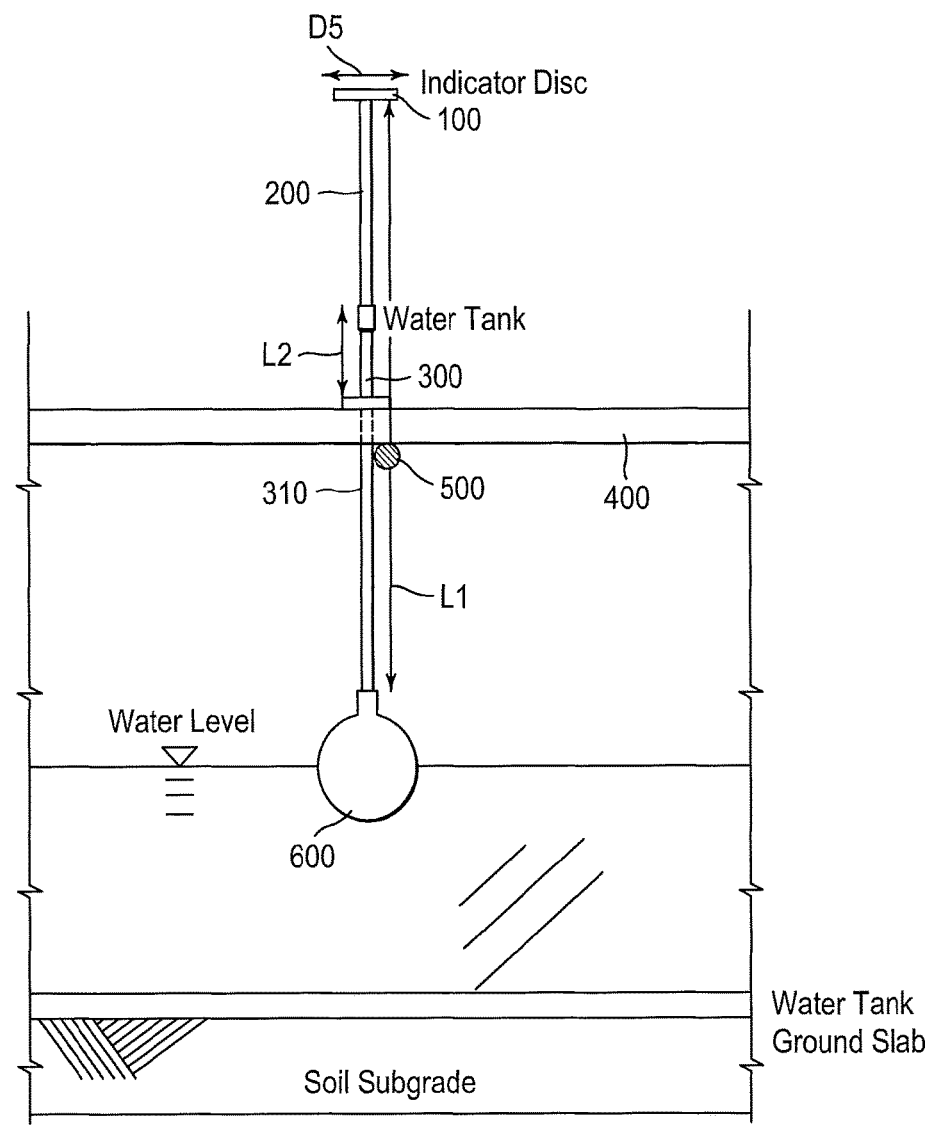
FIG. 2 depicts a schematic cross-sectional view of an exemplary embodiment.

In an exemplary embodiment, the system may further include elements located below ground level, or in an otherwise difficult to access location, e.g. below a roof slab (400), as shown in FIG. 2.

As shown in the exemplary embodiment of FIG. 2, the system may also include a water flow detector or dynamo circuit (500), and a float ball (600). The sleeve (300) may include a portion located above the slab (400), and a portion located below the slab (310). In an exemplary embodiment, the slab provides means for the pole (200) to slide up or down as the float ball (600) rises or sinks with the water level in the tank. Accordingly, as the float ball (600) is raised or lowered under Archimedes' buoyancy principles, the pole (200) transfers motion to the indicator disk (100). As the water level in the tank rises or falls the pole assembly, capped by the indicator disk on top, rises and falls indicating rise and fall of the water level. In an exemplary embodiment, a user may look at the height of the indicator disk (100) above ground to assess the water level in the tank. In an exemplary embodiment, the indicator disk may notify the user as to whether water is inflowing into the tank. In an exemplary embodiment, as water flows into a tank, it passes through the dynamo (500) where a flow sensor in turns actuates an LED indicator on the indicator disk (100). In an exemplary embodiment, a blinking LED indicates an inflow of water into the tank.

Figure 3A:
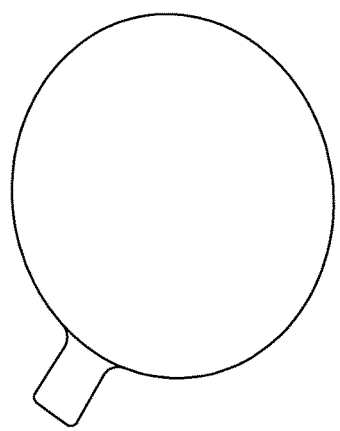
FIGS. 3a and 3b depicts a three-dimensional and a schematic cross-sectional view of a float ball of an exemplary embodiment.
Figure 3B:
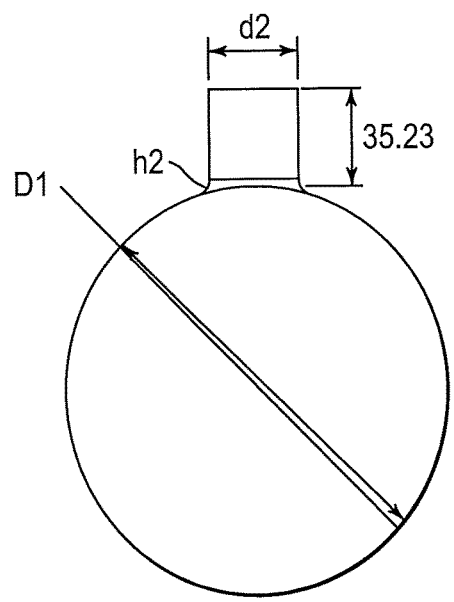

In an exemplary embodiment, as shown in FIGS. 3a and 3b, the float ball may be a spherical ball. In an exemplary embodiment, the float ball may have a major diameter (D1) of 150 mm, and may be made of fiberglass skin. In an exemplary embodiment, the float ball may be made of any rust-resistant material. In an exemplary embodiment, the float ball may also have a port with a port diameter (d2) and a port height (h2). In an exemplary embodiment, the port diameter d2 may be 35 mm and the port height h2 may be 35 mm. In an alternative embodiment, port dimensions may be determined relative to the pole diameter. The inside of the port may be female-threaded to accommodate a matching male thread on the pole (200).

Figure 5:
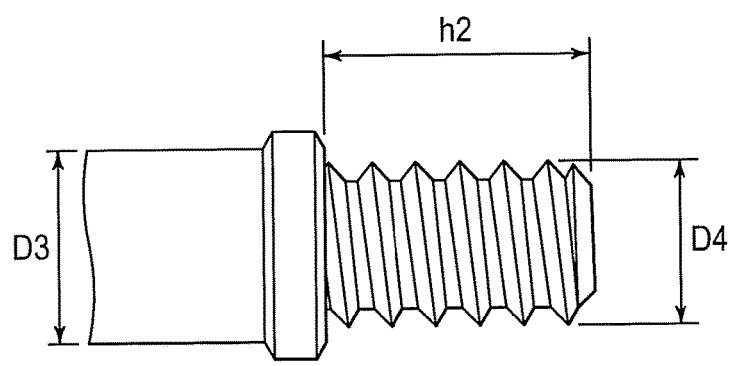
FIG. 5 depicts a three-dimensional view of a threaded end of a pole in an exemplary embodiment.

In an exemplary embodiment, the pole (200) may have a diameter (D3) and a length (L1). In an exemplary embodiment, the pole diameter (D3) may be 25 mm, while the length of the pole (L1) may be between 1200 mm and 2400 mm. In an alternative embodiment, the length of the pole may be adjusted to match the depth of the tank in order to function properly for any liquid level within the tank. In an exemplary embodiment, the pole may be extendable, such that it can be twist-locked at any length (L1) between its minimum length and its maximum length. In an exemplary embodiment, the pole may be twist-locked at any length (L1) between 1200 and 2400 mm. As shown in the embodiment of FIG. 5, at one end of the pole is a male-threaded tip with a diameter (D4) and a height (H2). In an exemplary embodiment, the diameter (D4) may be 18.5 mm, while the height (H2) may be 28 mm. In an exemplary embodiment, the indicator disk may have a diameter (D5). The diameter (D5) may be 160 mm. The indicator disk may be made of aluminum. In alternative embodiments, the indicator disk may be made of fiberglass or PVC.

Figure 7:
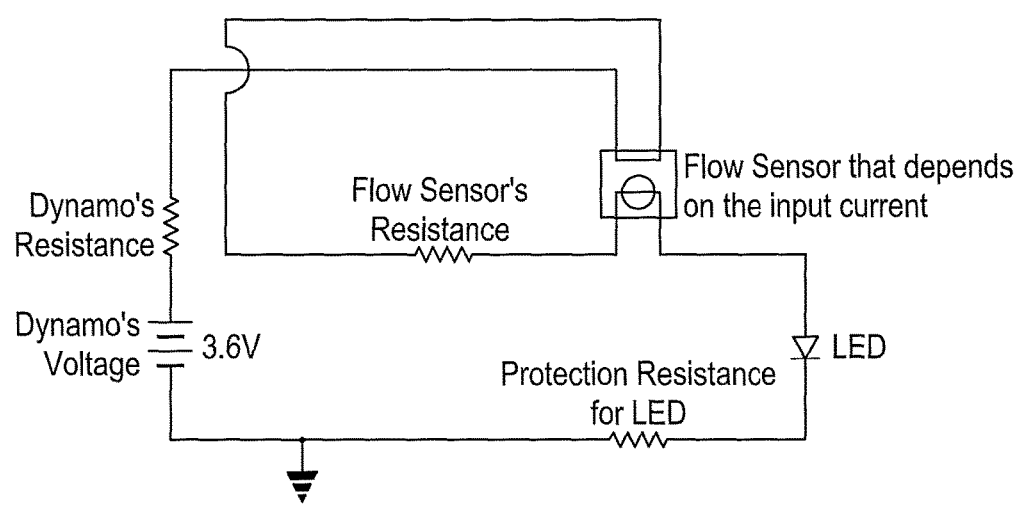
FIG. 7 depicts a schematic diagram of a flow sensor circuit in an exemplary embodiment.

In an exemplary embodiment, the water flow detector may include an electric circuit with a flow sensor or switch, a dynamo, and a LED, as shown in the exemplary embodiment of FIG. 7. In an exemplary embodiment, the dynamo may be a 3.6 volt and 300 mA dynamo, and the LED may be a 3.6 volt and 300 mA LED. The electric circuit (500) may be attached to the sleeve (300), as shown in FIG. 2.

Figure 6:
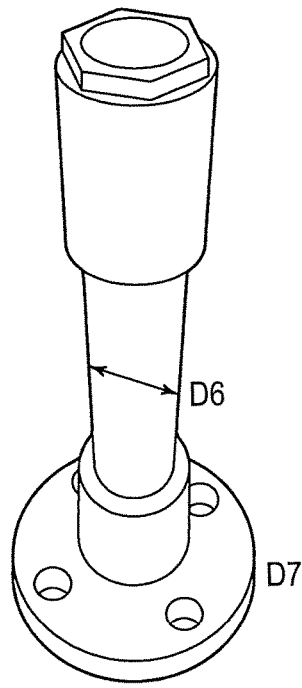
FIG. 6 depicts a three-dimensional view of a pole sleeve in an exemplary embodiment.

In an exemplary embodiment, the sleeve may have a diameter (D6) and length (L2). In an exemplary embodiment the sleeve may be made of PVC. In an alternative embodiment, the sleeve may be made of aluminum. In alternative embodiments, the diameter (D6) may be 32 mm, and the length (L2) may be 250 mm. As shown in the exemplary embodiment of FIG. 6, the sleeve may include a flange which rests over the slab (400). In an exemplary embodiment, the flange may have a diameter (D7) of 120 mm. The flange may be secured to the slab (400) by screws. In an exemplary embodiment, the screws may be steel screws with an 8 mm diameter. In an exemplary embodiment, the lower part of the sleeve located below the flange may be glued to the portion of the sleeve including the flange.

Figure 8:
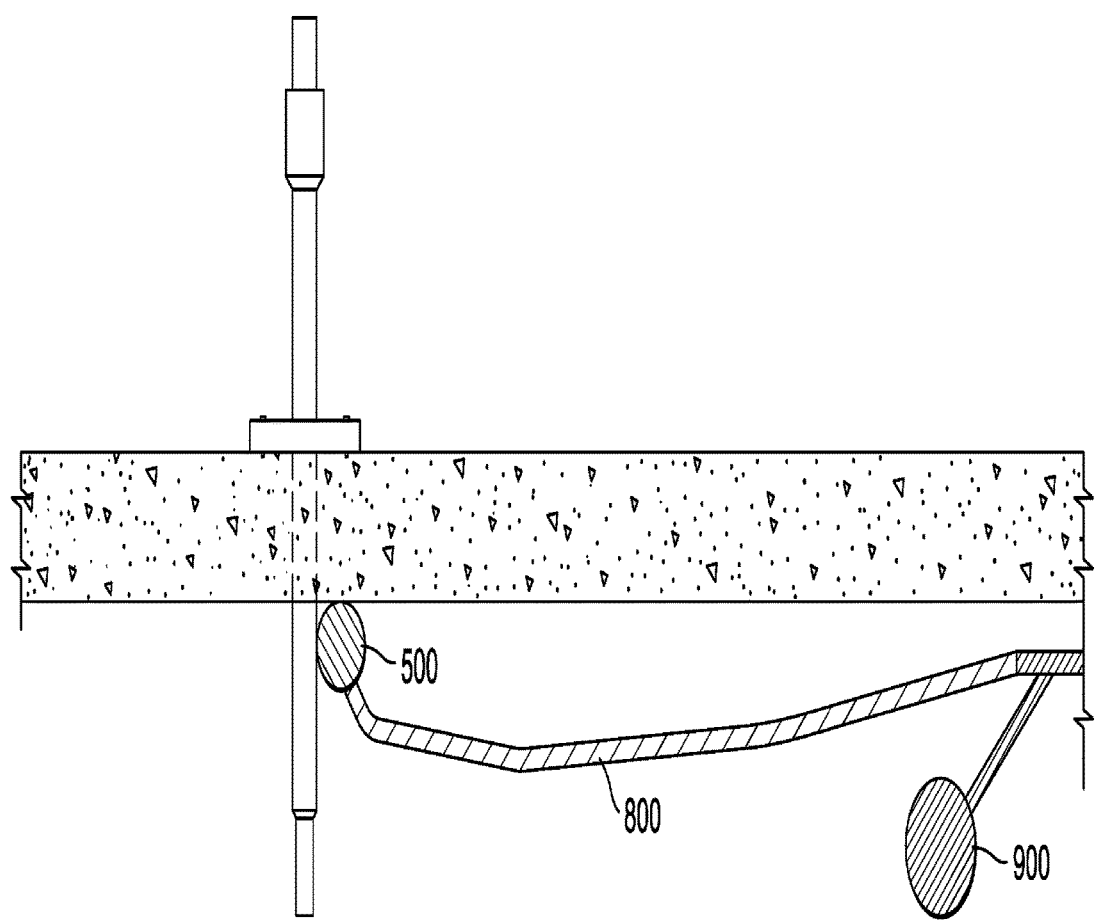
FIG. 8 depicts a schematic diagram of a hose connection in an exemplary embodiment.

In an exemplary embodiment, as shown in FIG. 8, a hose may be fitted at one end to a water source, and at another end to the inlet of the dynamo. In an exemplary embodiment, the hose may be a standard plastic ½ inch diameter garden hose.

In an exemplary embodiment, a system may be installed by first drilling a hole with a diameter matching the outer diameter of the sleeve (300) through a slab (400). An extension of the sleeve (310) may be inserted in the hole and glued to the bottom of the sleeve (300). In an exemplary embodiment, the sleeve may be fixed over the hole, such that the center of the pole (200) and center of the sleeve (300) are aligned with the center of the hole. The sleeve (300) may then be secured to the slab (400) by inserting screws in the flange of the sleeve, before inserting the pole (200) through the sleeve. The water flow detector circuit may then be fitted onto the sleeve extension (310). As shown in FIG. 8, a plastic hose (800) may be fitted with one end connected to the influent water pipe or water source (900), and another end connected to the dynamo circuit (500). In an exemplary embodiment, the LED indicator may be fixed on the indicator disk (100). In an alternate embodiment, the LED indicator may be fixed on the outside wall of the upper PVC sleeve (300). In an exemplary embodiment, the threaded end of the pole (200) may be inserted into the sleeve and through the hole into the tank. Once the pole has been inserted through the hole, the float ball (600) may be held under the lower side of the hole, such that it can be screwed tight to the lower end of the pole (200). Once the pole and float ball have been assembled, the pole may then be extended to the desired length and twist-locked to fix the length. Finally, the pole and float ball assembly may be dropped into the tank to float, thereby indicating the level of liquid in the tank.

Because many possible embodiments may be made of the invention without departing from the scope thereof, it is to be understood that all matter herein set forth or shown in the accompanying drawings is to be interpreted as illustrative and not in a limiting sense.

The invention claimed is:

1. A system comprising:
    a tank for containing a liquid;
    a floating device which floats in the liquid;
    a pole connected at a first end to the floating device;
    a pole sleeve attached to a top of the tank;
    a water flow detector;
    an indicator located at a second end of the pole,
    a flow detector circuit; and
    a hose, connected at a first end to an influent liquid pipe and at a second end to a dynamo of the flow detector circuit,
    wherein the liquid which flows into the tank generates a current in the flow detector circuit and activates the indicator,
    wherein when a level of the liquid changes the floating device moves the pole inside the pole sleeve, and
    wherein when a liquid flows into the tank the indicator generates a signal to a user.

2. The system as claimed in claim 1, wherein a height of the indicator indicates the level of the liquid in the tank.

3. The system as claimed in claim 1, wherein the status of the indicator indicates whether liquid is flowing into the tank.

4. The system as claimed in claim 1, wherein the indicator includes an LED which flashes when liquid is flowing into the tank.

5. The system as claimed in claim 1, wherein the pole has a length of 1,200 mm to 2,400 mm.

6. The system as claimed in claim 1, wherein one end of the pole has a male-threaded tip.

7. The system as claimed in claim 1, wherein the indicator is a disc made of at least one material selected from the group consisting of aluminum, fiberglass and PVC.

8. The system as claimed in claim 1, wherein the floating device is a ball float.

* * * * *